Jan. 21, 1969     J. C. McALVAY     3,422,767
VARIABLE DISPLACEMENT SWASHPLATE PUMPS
Filed Dec. 5, 1966     Sheet 1 of 2
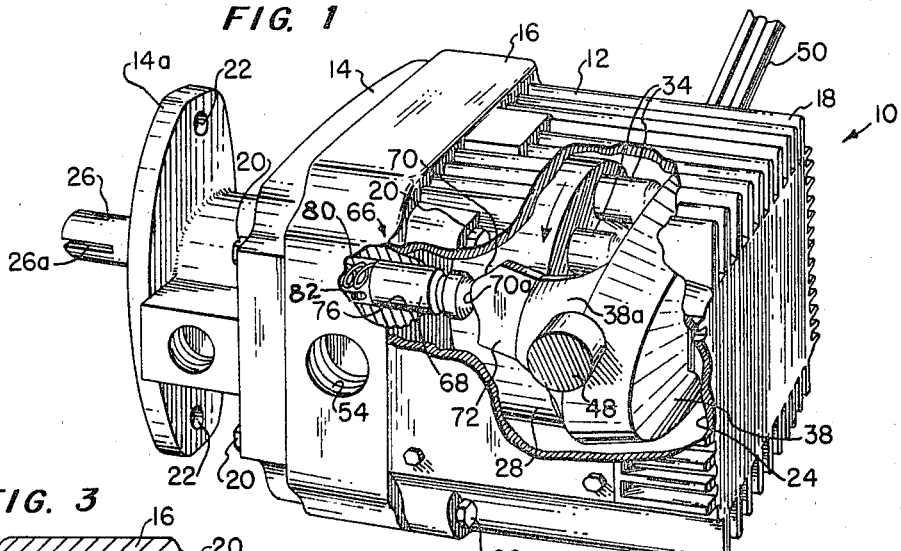
FIG. 1
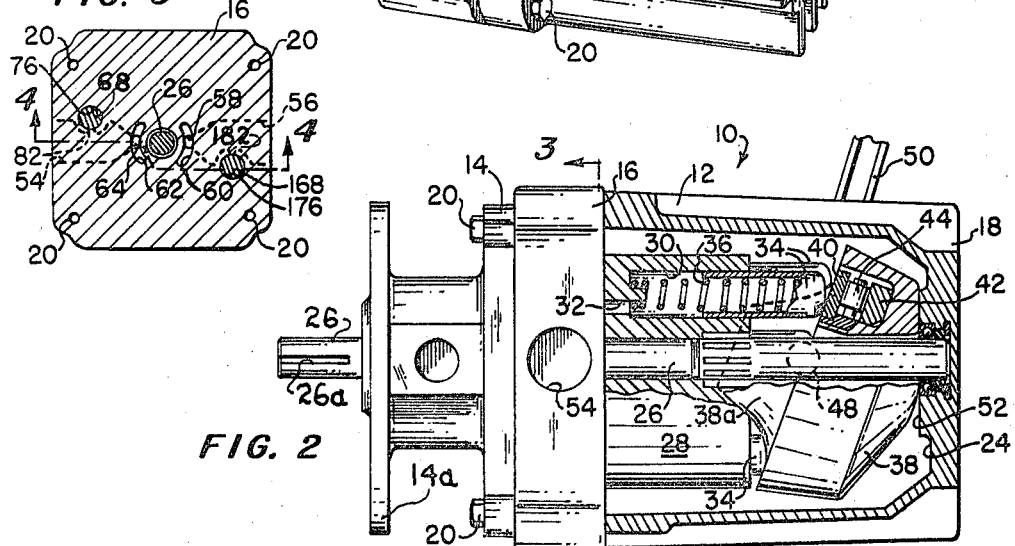
FIG. 3
FIG. 2
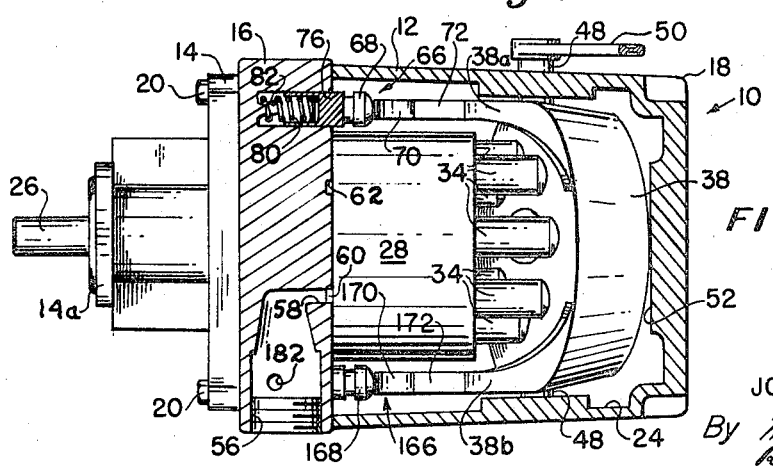
FIG. 4
INVENTOR
JOHN C. McALVAY
By Mason, Kolehmainen, Rathburn & Wyss
Attorneys INVENTOR
JOHN C. McALVAY
By Mason, Kolehmainen,
Rathburn & Wyss
Attorneys United States Patent Office 3,422,767
Patented Jan. 21, 1969

3,422,767
VARIABLE DISPLACEMENT SWASHPLATE PUMPS
John C. McAlvay, Racine, Wis., assignor to Webster Electric Company, Inc., Racine, Wis., a corporation of Delaware
Filed Dec. 5, 1966, Ser. No. 599,028
U.S. Cl. 103—162       11 Claims
Int. Cl. F04b 1/20

ABSTRACT OF THE DISCLOSURE

A variable displacement swashplate pump includes a handle coupled to the swashplate for moving the swashplate through a range of inclination to vary pump displacement. The pumping piston reaction torque exerted on the swashplate is combined with an additional torque developed by a compensating arrangement to provide a predetermined resultant torque applied to the handle to facilitate pump displacement control.

---

The present invention relates to variable displacement swashplate pumps, and has for an object the provision of a swashplate pump including novel means for changing the force which must be exerted against the swashplate in order to control the displacement of the pump.

In many applications of swashplate pumps, it is desirable to control the displacement of the pump, either manually or otherwise. For example, in a closed hydraulic system such as a transmission, the speed of operation of a hydraulic motor may be controlled by controlling the pump displacement. The pump displacement is commonly controlled by means of a hand lever which may be, for example, attached to the swashplate trunnion shaft outside of the pump housing.

In the operation of a swashplate pump the pumping pistons act against the swashplate and produce a reaction torque tending to move the swashplate. In one type of pump, wherein spherical ended pumping pistons bear directly against a swashplate bearing surface, a large torque is produced tending to force the swashplate to the zero displacement position. The magnitude of this reaction torque depends upon the swashplate position, pump outlet pressure, and to some extent on other factors. The reaction torque produced may be within the range of 100 to 150 foot pounds or higher. Obviously such large torques make hand lever control of the swashplate more difficult than is desirable.

With some known swashplate pumps, this problem has been met by increasing the mechanical advantage of the manual control, either through mechanical means or hydraulic means. In hydraulic arrangement, a pilot valve is used to control the flow of high pressure fluid to pistons for forcing the swashplate to the desired position. In mechanical arrangements, the usual lever may be replaced with a hand wheel and worm gear combination for adjusting the swashplate, or may be replaced with other mechanical elements for increasing the mechanical advantage. Such systems are complicated and expensive, and divorce the operator from the feel of the pump.

It is also possible to change the force required to control the pump by using piston shoes or connecting rods between the pumping pistons and the swashplate. This adds expense to the pump, and does not eliminate the problem because undesirable torques are still present at some pressures and speeds. Another possibility is to change the swashplate trunnion shaft axis with respect to the swashplate bearing surface. However, this is an inflexible arrangement and works well only for a particular pump arrangement. if the pump is altered, for example by the addition of entrapment relief grooves, or silencing grooves, for use at higher pressures, then the control forces of the pump are substantially changed. It would be expensive and inconvenient to change the swashplate trunnion axis for each modification of the pump.

Accordingly, it is an object of the present invention to provide an improved variable displacement swashplate pump.

Another object is to provide a swashplate pump including novel means for changing the forces which are required to control the pump displacement.

Another object is to provide an improved manually controlled variable displacement swashplate pump in which the manual force required to overcome the pumping piston reaction torque and control the pump is substantially reduced at all swashplate positions, or is otherwise altered for improved manual control.

Still another object is to provide a novel arrangement for pressure compensation of a swashplate pump.

A further object is to provide novel swashplate pump compensating means that can conveniently be adjusted to provide different control characteristics.

In brief, an embodiment of the present invention may comprise a swashplate pump including an assembly of rotating pumping pistons engaging a swashplate. The swashplate is mounted for tilting movement in order to vary the pump displacement. A hand lever, or other manual or hydraulic means, is connected to the swashplate in order to control its position. During operation of the pump, the pumping pistons act against the swashplate to produce a reaction torque which urges the swashplate toward the minimum displacement position. The magnitude of the pumping piston reaction torque depends upon swashplate position, pump output pressure and other factors, and may become quite large.

In order to compensate for the reaction torque and in accordance with an important feature of the present invention, there is provided a novel compensating arrangement for changing the resultant torque acting upon the swashplate, thereby to facilitate manual or other control. Thus, there is provided a cam surface fixed with respect to the swashplate, and a control cylinder associated with the pump housing and communicating with the pump outlet pressure. A control piston is disposed in the control cylinder and is biased against the cam surface by outlet pressure. The control piston acts against the cam surface and subjects the swashplate to an additional torque which combines with the pumping piston reaction torque to provide a desired resultant torque. The magnitude and direction of the additional torque is determined by the shape and position of the cam surface and the control piston.

In one illustrated embodiment of the present invention, the cam surface and the piston are designed to reduce the resultant torque in most swashplate positions, and to increase the torque near the zero displacement position. This arrangement provides the operator with a definite "feel" of the zero displacement position, and in addition provides a "dead man's throttle" feature whereby the pump automatically returns to the zero displacement position if the control is released. In a second illustrated embodiment, the compensating means substantially counterbalances the pumping piston reaction torque at all swashplate positions, and the force required to control pump displacement is reduced substantially to zero.

In accordance with another feature of the invention, the swashplate pump may be reversible by tilting the swashplate in either of two directions from the minimum displacement position. In order to provide pressure compensation in each direction of pump operation, there is provided a pair of pressure compensating means, each operative when the swashplate is tilted in one direction.

Another feature of the invention resides in the convenient arrangement for output compensation of the swashplate pump. In accordance with this feature, the cam surface is carried on the swashplate within the pump housing. The control cylinder is positioned in the valve or porting block of the pump beneath the swashplate, whereby the cylinder can conveniently and easily be communicated with the pump outlet port. The control piston extends, within the pump housing, from the control cylinder to the cam surface in order to provide the desired compensating torque. In addition, the compensating means may easily be altered to change the control characteristic, to adapt for changes in the pump construction, or for use with different pumps.

These and other objects and advantages of the invention will be apparent from the folowing detailed description of illustrative embodiments of the invention, taken in connection with the accompanying drawings, wherein:

FIG. 1 is a perspective view, partly broken away, of a variable displacement swashplate pump embodying the feature of the invention;

FIG. 2 is a side view, partly in section, of the pump of FIG. 1;

FIG. 3 is a sectional view on a reduced scale taken along the line 3—3 of FIG. 2;

FIG. 4 is a top sectional view, with part of the portion shown in section being taken along the line 4—4 of FIG. 3;

Figure 5:
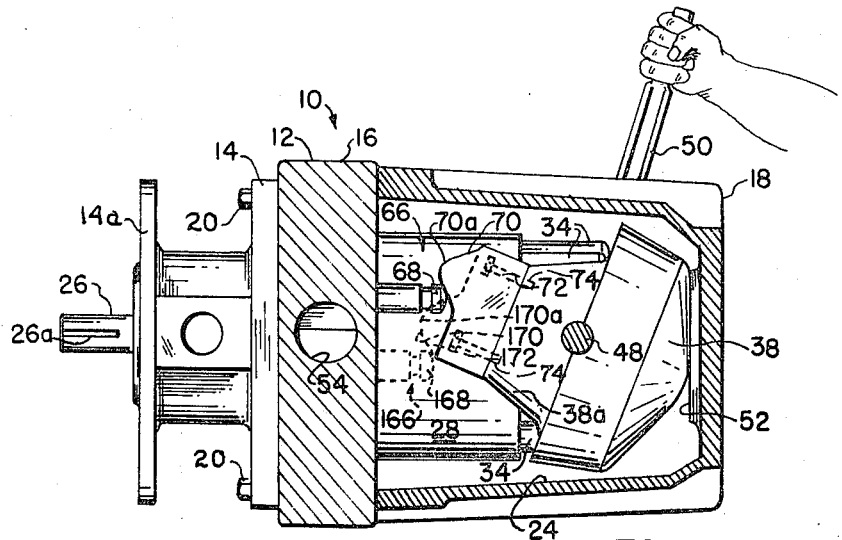
FIG. 5 is a side sectional view of the pump shown in FIG. 1.

Referring now to the drawings, there is illustrated a variable displacement swashplate pump generally designated as 10 and embodying the features of the present invention. The pump 10 has a housing 12 including a base 14, a porting or valve block 16 and a somewhat cup-shaped casing 18, these portions being held together by bolts 20. The base 14 includes a suitable mounting flange 14a provided with openings 22 for mounting the pump. An interior chamber 24 is defined between the casing 18 and valve block 16.

Extending axially through the housing 12 is a drive shaft 26 mounted for rotation in suitable bearings in the casing 18, valve block 16 and base 14. An end of the drive shaft 26 projects from the base 14 and includes a key-way 26a enabling the drive shaft 26 to be rotated by a motor or other means. Keyed to the drive shaft 26 within the chamber 24 is a cylinder barrel 28 adapted to rotate with the shaft and with one surface in sliding engagement with the valve block 16.

Referring now to FIG. 2, the cylinder barrel includes a plurality of pumping cylinders 30 spaced annularly around and parallel to the drive shaft 26. The pumping cylinders 30 communicate with the surface of the valve block 16 by means of passageways 32. A generally cup-shaped, spherical-ended pumping piston 34 is mounted for axial sliding movement in each pumping cylinder 30. Each pumping piston 34 is biased outwardly of the cylinder into the chamber 24 by means of a spring 36.

When the drive shaft 26 and cylinder barrel 28 are rotated, the pumping pistons 34 are caused axially to reciprocate by means of a tilting box or swashplate designated as a whole by the numeral 38. The swashplate 38 is provided with a bearing assembly including a bearing ring 40, a back-up ring 42, and interposed bearing means 44, all disposed in an annular recess in the swashplate 38 (FIG. 2). As the cylinder barrel 28 rotates, the spherical-ended pumping pistons 34 bear against the bearing ring 40, and the pumping pistons 34 are caused to reciprocate through a stroke determined by the angular position of the swashplate.

The swashplate 38 is mounted for rotational or tilting movement on a pair of trunnion shafts 48 journaled in the casing 18. One of the trunnion shafts 48 extends outwardly of the casing 18 and is provided with a hand lever 50 with which the operator of the pump 10 may tilt the swashplate 38 to adjust the displacement of the pump.

In the illustrated embodiments of the invention, the swashplate 38 is movable continuously between a zero displacement position (FIG. 6A) in which the swashplate is normal to the pumping pistons 34, and either a forward or a reverse full displacement position in which the swashplate 38 is inclined approximately 15 degrees in either direction from the rotational axis of the cylinder barrel 28 (FIGS. 1–5 and 6B). The swashplate 38 is prevented from being tilted more than approximately 15° by engagement of the rear of the swashplate 38 with a stop 52 on the casing 18.

Fluid is communicated to and from the pumping cylinders 30 by means of a pair of ports 54 and 56 in the valve block 16. Each port may serve either as a low pressure inlet or a high pressure outlet, depending upon the direction of rotation of the pump 10, and upon the direction in which the swashplate 38 is tilted. As illustrated in FIGS. 1–5, and assuming the cylinder barrel 28 to be rotating in the direction shown by the arrow in FIG. 1, port 54 serves as the outlet and is at high pressure. Were the swashplate 38 to be tilted in a reverse direction, as illustrated diagrammatically in FIG. 6B, then port 56 would serve as the high pressure outlet and port 54 would serve as the low pressure inlet.

In normal forward operation, low pressure fluid enters the port 56 and travels through a passageway 58 to a somewhat cresent-shaped opening 60 in the face of the valve block (FIGS. 3 and 4), where it enters the passing pumping cylinders 30. High pressure fluid from the pumping cylinders 30 is expelled through another opening 62 and through an additional passageway 64 communicating with the outlet port 54.

Figure 7:
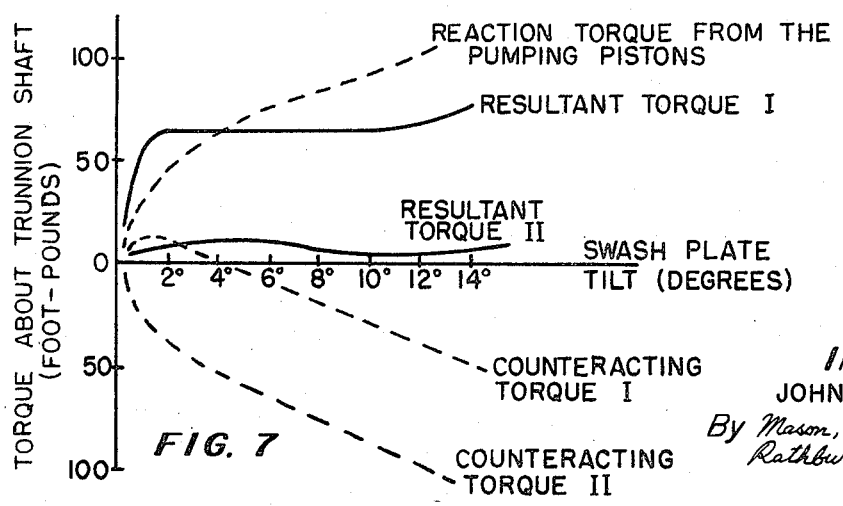
FIG. 7 is a graph illustrating some of the operating characteristics of the pump illustrated in FIGS. 1–6, and of an alternative embodiment of the invention.

It will be appreciated that during operation of the pump 10, the pumping pistons 34 bear against the swashplate 38, and it has been found that the pumping pistons act upon the swashplate to produce a reaction torque which, in the pump illustrated in the drawings, urges the swashplate 38 toward the zero displacement position normal to the pumping pistons. This reaction torque is related to outlet pressure, swashplate inclination, and other factors. Referring to FIG. 7, the pumping piston reaction torque is plotted for a constant outlet pressure of 3,000 p.s.i. It will be seen that near the full displacement swashplate position the reaction torque exceeds 100 foot pounds. In other words, in order to hold the pump near its maximum displacement position, the operator of the pump must apply to the hand lever 50 a force sufficient to overcome in excess of 100 foot-pounds of torque. Obviously, the necessity of applying such a large force interferes with the ease of operation and control of the pump.

In accordance with a feature of the present invention, there is provided novel compensating means, designated generally by the numeral 66, for changing the resultant torque which urges the swashplate to rotate about its tilt axis. The compensating means 66 includes a control piston 68 biased by pump outlet pressure against a cam surface 70 fixed with respect to the swashplate 38. As appears hereinafter, the control piston 68 and cam surface 70 are designed to produce an additional torque acting on the swashplate so that the resultant torque of the pumping piston reaction torque and the additional torque is such that control of the pump 10 is facilitated.

More specifically, the swashplate 38 includes an extension 38a upon which a cam block 72 is secured by bolts 74 (FIG. 5). The outer surface of the cam block 72 defines the cam surface 70, including a substantially circular nose portion 70a.

Disposed in the valve block 16 beneath the cam surface 70 is a control cylinder 76 (FIGS. 1, 3 and 4). The control piston 68 is slideably mounted within the control cylinder 76 and includes a spherical end which is biased into the chamber 24 by a spring 80. The control cylinder 76 communicates continuously with the acting outlet port 54 by means of a passage 82.

In forward operation of the pump 10, the control piston 68 is continuously subjected to outlet pressure from the acting outlet port 54, and is thereby urged against the cam surface 70. The shapes of the cam surface 70 and piston 68, as well as their relative positions at various swashplate positions, determine the magnitude and direction of the force applied to the swash plate 38, and thus the magnitude and direction of the additional compensating torque produced.

Figure 6B:
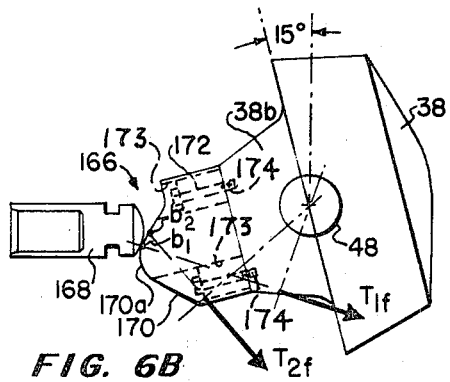
FIGS. 6A and 6B are diagrammatic representations of the control piston and swashplate in the zero displacement and maximum displacement positions respectively.

As noted above, the pump is reversible since the swash plate 38 may be tilted in the reverse direction from that illustrated in FIGS. 1–5 (i.e., the direction illustrated in FIG. 6B). In this case, the port 54 acts as the inlet port while the port 56 acts as the outlet port. In order to counterbalance to a desired extent the pumping reaction torque when the pump is operated in the reverse direction, and in accordance with a feature of the invention, there is provided a second compensating means 166 similar to and symmetrically located with respect to the compensating means 66 described above.

Figure 6A:
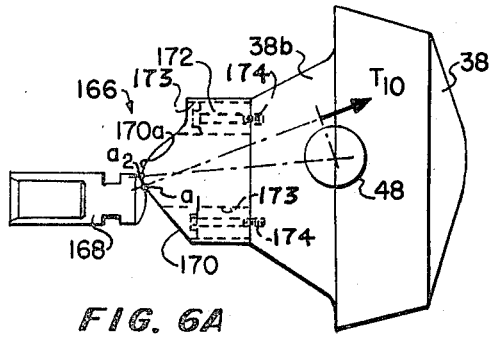

The second or reverse direction compensating means 166 includes a control piston 168 (FIGS. 3, 4, 5, 6A and 6B) which is biased against a cam surface 170 fixed with respect to the swashplate 38. More specifically, the swashplate 38 includes an extension 38b, opposite the extension 38a, upon which a cam block 172 is secured by bolts 174 (FIGS. 6A and 6B). The outer surface of the cam block 172 defines the cam surface 170, including a substantially circular nose portion 170a. A control cylinder 176 (FIG. 3) is disposed in the valve block 16, and the control piston 168 slides in the control cylinder and is biased outwardly by a spring (not shown). The control cylinder 176 communicates continuously with the port 56 through a passageway 182.

The components of the forward direction compensating means 66 are disposed symmetrically with respect to the compoments of the reverse direction compensating means 166. In forward operation, as described above, the control piston 68 is biased by outlet pressure from port 54 against the cam surface 70 to produce an additional compensating torque about the swashplate tilt axis. The low pressure fluid communicated to the second control cylinder 176 from the inlet port 56 has no appreciable effect on pump operation. In reverse operation, when port 54 acts as the inlet and port 56 acts as the outlet, the situation is the reverse: control piston 168 is biased by outlet fluid from port 56 against cam surface 170 to provide an additional torque about the swashplate axis and control piston 68 does not affect pump operation.

Having reference now to FIGS. 6A and 6B, the positions of the control piston 168, swashplate 38 and cam surface 170 are shown diagrammatically in the zero and reverse maximum displacement positions. It should be understood that a coresponding diagram could be prepared for the forward direction, without changing the following analysis.

In FIG. 6A, it will be noted that the control piston 168 engages the cam surface 170 at the point $a_1$ when the swashplate 38 is in the zero displacement position. Assuming that it were possible for the pump to have an outlet pressure of 3,000 p.s.i. when in this position, a torque $T_{10}$ would be produced as indicated on the drawing. Proceeding now to FIG. 6B, the swashplate 38 is shown in the maximum reverse direction displacement position. Here the control piston 168 engages the cam surface 170 at the point $b_1$ and a torque $T_{1F}$ is produced. It should be noted that the torque $T_{1F}$ acts in opposition to the reaction torque produced by the pumping pistons and thus substantially reduces the force required to hold the swashplate 38 in the maximum displacement position. It should also be noted that when the pump is at or near the zero displacement position (FIG. 6A), the additional torque $T_{10}$ provided by the control piston 168 actually adds to or reinforces the torque caused by the pumping pistons.

Referring now to FIG. 7, this operation is illustrated in graphical form. As noted previously, the pumping piston reaction torque is plotted on the graph. The additional torque caused by the action of the control piston 168 against the cam surface 170 is labeled "COUNTERACTING TORQUE I." It will be noted that for swashplate inclinations between zero and approximately 4° the counteracting torque I acts in the same direction as the reaction torque. Between approximately 4° and the maximum displacement position, the counteracting torque acts in opposition to the pumping piston reaction torque. The resultant torque (labeled "RESULTANT TORQUE I") increases rapidly as the swashplate is moved from the zero displacement position to about 2°, and thereafter remains substantially constant. It should be appreciated that this resultant torque is the torque which must be overcome by the operator in manipulating the hand lever 50. The sharp drop-off of the curve near the zero displacement position has certain advantages in that the operator experiences a marked "feel" of the zero displacement position. In addition, this arrangement provides a "dead man's throttle" effect because if the lever 50 is released, the swashplate 38 returns rapidly to the zero displacement position.

An alternative embodiment of the invention is illustrated diagrammatically and graphically in FIGS. 6A, 6B and 7. Referring first to FIG. 6A, the cam block 172 may be displaced a slight amount, or the control piston 168 may be designed so that in the illustrated zero displacement position the control piston 168 contacts the cam surface 170 at the point $a_2$. With this arrangement, in the zero displacement position the line of application of force from the control piston 168 passes through the swashplate tilt axis (i.e., center of the trunnion shaft 48). As a result, no torque is applied to the swashplate 38. When the swashplate is moved to the maximum displacement position illustrated in FIG. 6B, the control piston 168 contacts the cam surface 170 at the point $b_2$. Thus, in the maximum displacement position, the torque $T_{2F}$ is produced. It should be noted that this torque is larger than the torque $T_{1F}$ of the first embodiment, due principally to the increased effective lever arm through which it acts around the swashplate axis.

Proceeding now to FIG. 7, the counteracting torque of the second embodiment is shown graphically, and labeled "COUNTERACTING TORQUE II." It will be seen that this counteracting torque is substantially larger than the counteracting torque of the first embodiment, and unlike that torque, it acts in opposition to the pumping piston reaction torque throughout the range of movement of the swashplate. The pumping piston reaction torque and the counteracting torque II produce the "RESULTANT TORQUE II" shown on the diagram. This resultant torque is very close to zero throughout range of swashplate movement and, as a result, in this embodiment of the swashplate can be moved with great ease to any desired angular position.

In accordance with the invention, the compensating means 66 and 166 are highly flexible and can inexpensively and conveniently be altered to change the characteristic of the counteracting torque. Thus the arrangement can easily be adapted for use in different pumps, and for use in modifications of the pump 10. Such alterations can be made by changing the shape of the end of the control pistons 68 and 168, or by moving the cam surface 70 or 170 with respect to the swashplate axis. For example, referring to FIGS. 6A and 6B, the cam block 172 is provided with slots 173 receiving the bolts 174, so that the cam block is adjustable with respect to the swashplate 38. Also, if desired, it is possible to have different control characteristics in the forward and reverse directions.

While there have been described and illustrated certain preferred embodiments of the invention, it should be understood that the invention is not intended to be limited to the details of the illustrated embodiments except insofar as is set forth in the accompanying claims. For example, the principles of the invention, although described in connection with pumps, are applicable as well to motors. In addition, many features of the invention are applicable to automatically controlled pumps as well as manually controlled pumps as described above. Thus the compensating means could act in opposition to a spring or the like to provide automatic displacement control in response to pressure.

What is claimed as new and desired to be secured by Letters Patent of the United States is:

1. A variable displacement swashplate pump comprising:
   a housing;
   a rotatable assembly of pumping pistons in said housing;
   a swashplate directly engaged by said pumping pistons, said swashplate being movable about a tilt axis through a range of inclination with respect to said pumping pistons to vary pump displacement;
   displacement adjusting means operably connected to said swashplate for moving said swash plate in said range of inclination;
   said pumping pistons acting on the swashplate to produce a substantial reaction torque characteristic about the tilt axis having a magnitude varying with swashplate inclination;
   and compensating means for producing an additional torque characteristic about the tilt axis for changing the torque required to operate said displacement adjusting means, said compensating means comprising:
      a force applying means adapted to act against the swashplate;
      and force transmitting means coupling said force applying means to said swashplate;
      said force transmitting means being constructed and arranged to significantly alter in dependence upon the swashplate inclination the effective lever arm length about the tilt axis through which force is applied by said force applying means to said swashplate so that said additional torque characteristic and said reaction torque characteristic combine to apply a predetermined resultant torque characteristic to said displacement adjusting means.

2. A variable displacement swashplate pump as claimed in claim 1, said displacement adjusting means comprising manual means, said additional torque characteristic reducing the manual force required to control the pump.

3. A variable displacement swashplate pump as claimed in claim 1, said housing including a first port normally at high pressure and a second port, said force transmitting means including means defining a cam surface movable with the swashplate, a control cylinder in said housing, means communicating said control cylinder with said first port, and said force applying means including a control piston in said cylinder urged by pump outlet pressure against said cam surface.

4. A variable displacement swashplate pump as claimed in claim 3 wherein said swashplate is movable between a minimum displacement position, a maximum displacement position and a reverse maximum displacement position to reverse flow through said pump, said second port being at high pressure during reverse operation, said force transmitting means including means defining a second cam surface movable with the swashplate, a second control sylinder in said housing, means communicating said second control cylinder with said second port, and said force applying means including a second control piston in said second cylinder urged by pump outlet pressure against said second cam surface during reverse operation.

5. A variable displacement swashplate pump as claimed in claim 3, said cam surface defining means being adjustably mounted on the swashplate so that the position of the cam surface with respect to the tilt axis can be adjusted to vary said additional torque characteristic.

6. A variable displacement swashplate pump as claimed in claim 3 wherein said reaction torque characteristic urges said swashplate to the minimum displacement position, said cam surface and control piston being arranged so that said additional torque characteristic opposes said reaction torque characteristic at all swashplate positions.

7. A variable displacement swashplate pump as claimed in claim 3 wherein said reaction torque characteristic urges said swashplate to the minimum displacement position, said cam surface and control piston being arranged so that said additional torque characteristic substantially counterbalances said reaction torque characteristic at all swashplate positions.

8. A variable displacement swashplate pump as claimed in claim 3 wherein said reaction torque characteristic urges said swashplate to the minimum displacement position, said cam surface and control piston being arranged so that said additional torque characteristic augments said reaction torque characteristic when said swashplate is near the minimum displacement position and opposes said reaction torque at other swashplate positions.

9. A variable displacement swashplate pump including a housing, a rotating cylinder barrel having a plurality of pumping cylinders, pumping pistons in said cylinders, displacement varying means including a swashplate engaged by said pistons and including trunnion shaft means mounting said swashplate for tilting movement to vary the displacement of the pump, a valve block adjacent said cylinder barrel and including inlet and outlet passageways for communicating fluid to and from said cylinders, a cam block mounted on said swashplate and disposed to the side of said cylinder barrel, a cam surface defined by the projecting edge of said cam block, a control cylinder in said valve block in communication with said outlet passageway, and a control piston in said control cylinder including an end portion engageable with said cam surface.

10. A variable displacement swashplate pump as claimed in claim 9 additionally comprising a hand lever connected to said trunnion shaft means for holding said swashplate in a selected position, said control piston acting on said cam surface to reduce the hand lever forces required to hold the swashplate in position.

11. A variable displacement swashplate pump as claimed in claim 9 further comprising means adjustably positioning said cam block on said swashplate for altering the position of the cam surface with respect to the trunnion shaft axis.

References Cited

UNITED STATES PATENTS

| | | | |
|---|---|---|---|
| 2,915,985 | 12/1959 | Budzich | 103—162 |
| 3,075,472 | 1/1963 | Garnier | 103—162 |
| 3,159,041 | 12/1964 | Firth et al. | 103—162 |
| 3,190,232 | 6/1965 | Budzich | 103—162 |
| 3,282,225 | 11/1966 | Moon | 103—162 |
| 3,319,419 | 5/1967 | Hann | 60—53 |

WILLIAM L. FREEH, *Primary Examiner.*